(12) United States Patent
Helgesen et al.

(10) Patent No.: US 11,767,652 B2
(45) Date of Patent: Sep. 26, 2023

(54) DEVICE FOR SECURING A CONNECTION TO BE FORMED BETWEEN A LEG OF A MARINE STRUCTURE AND A PILE OF A FUNDAMENT FASTENED IN A SEABED

(71) Applicant: Imenco Corrosion Technology AS, Aksdal (NO)

(72) Inventors: Kjell Eivind Helgesen, Nedstrand (NO); Frode Vilhelmsen, Sævelandsvik (NO); Nils-Olav Digre, Sandnes (NO)

(73) Assignee: Imenco Corrosion Technology AS, Aksdal (NO)

( * ) Notice: Subject to any disclaimer, the term of this patent is extended or adjusted under 35 U.S.C. 154(b) by 207 days.

(21) Appl. No.: 17/297,608

(22) PCT Filed: Nov. 12, 2019

(86) PCT No.: PCT/PC2019/050246
§ 371 (c)(1),
(2) Date: May 27, 2021

(87) PCT Pub. No.: WO2020/111946
PCT Pub. Date: Jun. 4, 2020

(65) Prior Publication Data
US 2022/0025600 A1 Jan. 27, 2022
US 2022/0372722 A9 Nov. 24, 2022

(30) Foreign Application Priority Data

Nov. 28, 2018 (NO) .................................. 20181529
Jan. 22, 2019 (NO) .................................. 20190086

(51) Int. Cl.
*E02B 17/02* (2006.01)
*E02D 27/12* (2006.01)
(Continued)

(52) U.S. Cl.
CPC .............. *E02B 17/02* (2013.01); *E02D 27/12* (2013.01); *E02D 27/525* (2013.01);
(Continued)

(58) Field of Classification Search
CPC ................. E02B 17/02; E02B 17/0008; E02B 2017/0043; E02B 2017/0073; E02D 27/12; E02D 27/525
See application file for complete search history.

(56) References Cited

U.S. PATENT DOCUMENTS

| 4,669,918 A | 6/1987 | Riles |
| 4,934,869 A | 6/1990 | Brandon et al. |
| 2018/0223497 A1* | 8/2018 | Zhu ........................... E02D 5/60 |

FOREIGN PATENT DOCUMENTS

| DE | 102012024412 | 6/2014 |
| EP | 2404092 | 1/2012 |

(Continued)

OTHER PUBLICATIONS

Norwegian Search Report for Norwegian Patent Application No. 20190086, dated Aug. 9, 2019.
(Continued)

*Primary Examiner* — Sean D Andrish
(74) *Attorney, Agent, or Firm* — Andrus Intellectual Property Law, LLP (57) ABSTRACT

A device and a method for securing a connection to be formed between a leg of a marine structure and a pile of a fundament fastened in a seabed. The connection has the leg partly inserted into an opening of the pile. The device is configured to be firmly connected to the leg. The device comprises a sleeve element configured, together with the leg of the marine structure, to be brought to vicinity of an upper portion of the pile. The device further has a clamping arrangement attached to the sleeve element comprising at (Continued)

least one clamping device configured to form an attachment between the sleeve element and the upper portion of the pile.

17 Claims, 6 Drawing Sheets

(51) Int. Cl.
*E02D 27/52* (2006.01)
*E02B 17/00* (2006.01)

(52) U.S. Cl.
CPC ... *E02B 17/0008* (2013.01); *E02B 2017/0043* (2013.01); *E02B 2017/0073* (2013.01); *E02D 2600/20* (2013.01)

(56) References Cited

FOREIGN PATENT DOCUMENTS

| | | |
|---|---|---|
| EP | 3268539 | 1/2018 |
| GB | 2391052 | 1/2004 |
| GB | 2536228 | 9/2016 |
| GB | 2548965 | 10/2017 |
| WO | 2011147479 | 12/2011 |
| WO | 2019112421 | 6/2019 |

OTHER PUBLICATIONS

International Search Report and the Written Opinion for PCT/NO2019/050246, dated Feb. 4, 2020.

\* cited by examiner

DEVICE FOR SECURING A CONNECTION TO BE FORMED BETWEEN A LEG OF A MARINE STRUCTURE AND A PILE OF A FUNDAMENT FASTENED IN A SEABED

CROSS-REFERENCE TO RELATED APPLICATIONS

This application is the U.S. national stage application of International Application PCT/NO2019/050246, filed Nov. 12, 2019, which international application was published on Jun. 4, 2020, as International Publication WO 2020/111946 in the English language. The International Application claims priority of Norwegian Patent Application No. 20181529, filed Nov. 28, 2018 and Norwegian Patent Application No. 20190086, filed Jan. 22, 2019. The international application and Norwegian applications are all incorporated herein by reference, in entirety.

INTRODUCTION

The present invention relates to a device for securing a connection to be formed between a leg of a marine structure and a pile of a fundament fastened in a seabed. The installation comprising the leg partly inserted into an opening of the pile.

The present invention further relates to a marine arrangement, a marine installation comprising the device of the invention, and a method for securing the connection.

PRIOR ART

A connection of a marine structure, such as a jacket foundation for offshore wind turbines, is done by first forming a fundament of one or more piles secured in the seabed. The piles are generally tubular elements with an opening that are configured to receive the legs of a marine structure. The connection between the marine structure and the one or more piles is established by lowering the structure down to piles so that the legs are inserted in the opening of the piles. The operation of lowering and positioning the legs in the piles is done for example by means of a jack-up platform or a crane vessel.

After the legs of the structure have been inserted into the openings of the piles, the connection is secured by a grouting operation, in which the position of the legs in the piles are secured by introducing a flowable solidifier, such as a cement former, in a gap between the legs and the pile.

A problem with prior art installations is that the grouting operation is time consuming and requires the jack-up platform or the crane vessel to be located at the location of installation and suspending the structure during both the operation of positioning the legs in the piles and the grouting operation. Accordingly, the jack-up platform or a crane vessel is occupied during both operations and when installing a plurality of marine structure, such as for a wind park, the overall time requiring the jack-up platform or the crane vessel is large.

SUMMARY OF THE INVENTION

The invention has for its object to remedy or to reduce at least one of the drawbacks of the prior art, or at least provide a useful alternative to prior art. In particular, an object of the invention is to provide a device for reducing time and cost involved in installing a marine structure.

This object is obtained by means of a device for securing a connection to be formed between a leg of a marine structure and a pile of a fundament fastened in a seabed, wherein the connection comprising the leg partly inserted into an opening of the pile, wherein the device is configured to be firmly connected to the leg, the device comprises
- a sleeve element configured, together with the leg of the marine structure, to be brought to vicinity of an upper portion of the pile, and
- a clamping arrangement attached to the sleeve element comprising at least one clamping device configured to form an attachment between the sleeve element and the upper portion of the pile.

After the leg has been inserted into the opening so that the sleeve element is brought to vicinity or contact with the upper portion of the pile, the clamping arrangement is configured to be engaged so that firm attachment is provided between the leg of the structure and the pile of the fundament. The attachment between the leg of the structure and the pile of the fundament enables a lifting device to be disconnected and permits the structure to be left standing until a subsequent grouting operation is completed. Accordingly, the device of the invention facilitates the installation of the structure in that the need for the lifting device is reduced.

According to an embodiment of the invention, the clamping device comprises a clamp mechanism comprising a displaceable wedge configured to form a wedged engagement with the upper portion of the pile.

According to an embodiment of the invention, the clamp mechanism comprises a setting member configured to act on the wedge for forming the attachment between the sleeve element and the upper portion of the pile.

According to an embodiment of the invention, the setting member comprises an axial displaceable bolt configured to act on the wedge so that the wedge is displaced into engagement with said envelope surface of the pile.

According to an embodiment of the invention, the setting member comprises an arrangement involving engaging the wedge by pulling the displaceable bolt. Alternative embodiments of the setting member are applicable, such as by means of replacement of the displaceable bolt with a threaded bolt configured to be rotated for the purpose of acting on the wedge.

According to an embodiment of the invention, the displaceable bolt is configured to be controlled by means of a drive unit, wherein the clamping device comprises the drive unit or the clamping device comprises connection means for connection to a drive unit.

According to an embodiment of the invention, the drive unit is one of a hydraulic, pneumatic and electric driven drive unit.

According to an embodiment of the invention, the wedge is adapted to abut an envelope surface of the upper portion of the pile.

According to an embodiment of the invention, the clamping arrangement comprises two or more clamping device.

According to an embodiment of the invention, the device is further configured to provide an electric connection by engagement of the clamping device with the pile so that the electrical connection is established between the pile and the leg of the structure.

According to an embodiment of the invention, the device comprises a connection assembly configured to firmly connect the device to the leg.

According to an embodiment of the invention, the damping device comprises a displaceable piston rod configured to engage with upper portion of the pile so that an impact between the pile and the sleeve element is dampened.

According to an embodiment of the invention, the damping device comprises one of a hydraulic, pneumatic and electric driven piston rod.

According to an embodiment of the invention, the damping device comprises the drive unit or the damping device comprises connection means for connection to a further drive unit.

According to an embodiment of the invention, the damping device comprises the drive unit or the damping device comprises an inlet for receiving a hydraulic fluid or a compressed gas from an external drive unit.

According to an embodiment of the invention, the device comprises a connection assembly connected to the sleeve element and configured to firmly connect the sleeve element to the leg.

The object of the invention is further obtained by means of a marine arrangement comprising a marine structure with one or more legs and a device according to any of above embodiments attached to an end portion the one or more legs.

According to an embodiment of the invention, the marine arrangement further comprising a remotely operated vehicle comprising said drive unit.

The object of the invention is further obtained by means of a marine installation comprising a marine structure with one or more legs, a device according to any of above embodiments attached to the one or more legs of the structure and a pile of a fundament fastened in a seabed, wherein the clamping device has formed an attachment between the sleeve element and the upper portion of the pile.

The object of the invention is further obtained by a method for establishing a marine installation by means of a device according to any of above embodiments. The method comprises the steps of:
  connecting the marine structure to a lifting device,
  positioning the marine structure so that at least one leg of the structure is inserted into an opening of the pile,
  engaging the at least one clamping device so that an attachment is established between the sleeve element and a upper portion of the pile, and
  disconnecting the marine structure from the lifting device.

According to an embodiment of the invention, the method further comprises:
  filling a flowable solidifier into a gap at the leg and the pile after the attachment is established between the sleeve element and a upper portion of the pile, and
  solidifying the filling flowable solidifier.

According to an embodiment of the invention, the method further comprises:
  positioning the marine structure so that the damping device is dampening an impact between the sleeve element and the pile and an electric connection is established between the pile and the leg of the structure.

According to an embodiment of the invention, the method further comprises:
  displacing the piston rod of the damping device so that a spacing between the sleeve element and the upper portion of the pile is adjusted.

According to an embodiment of the invention, the method further comprises:
  displacing at least one of the piston rods of the damping devices at the legs of the structure so that the structure is arranged in a vertical or substantial vertical position in respect to the surface of the sea.

According to an embodiment of the invention, the method further comprises:
  establish a connection between a remotely operated vehicle and the device.

The object of the invention is further obtained by means of use of a device, a marine arrangement and a marine installation according to any of above embodiments.

BRIEF DESCRIPTION OF FIGURES

In the following is described examples of preferred embodiments illustrated in the accompanying drawings, wherein.

DETAILED DESCRIPTION OF THE INVENTION

Figure 1:
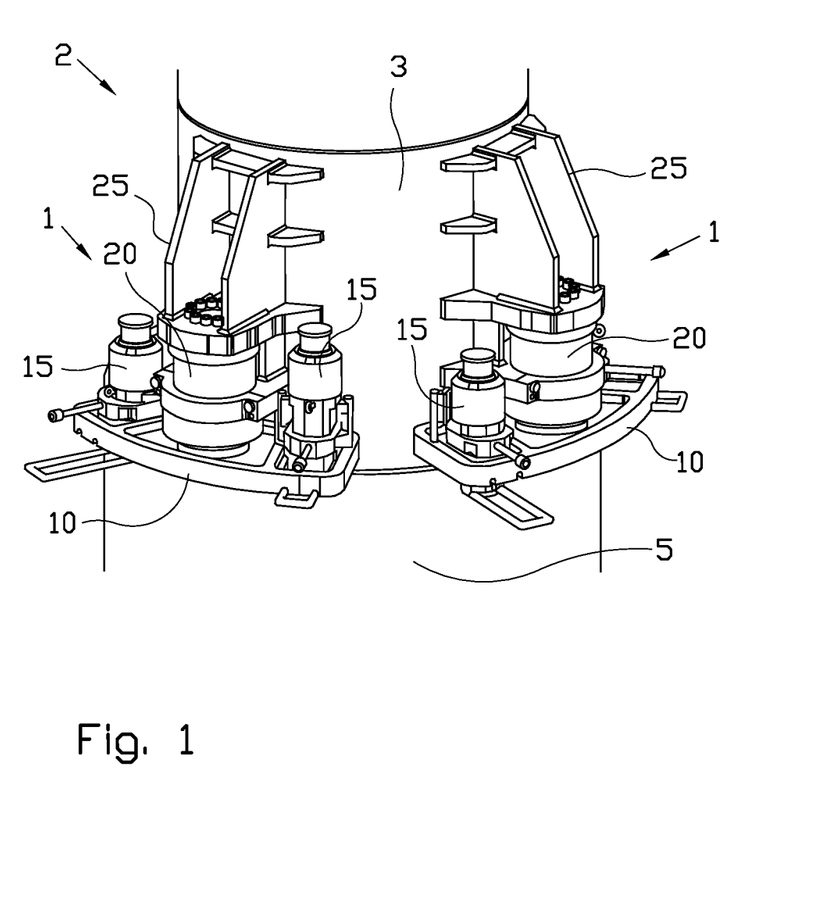
FIG. 1 discloses a marine installation according to an embodiment of the invention comprising a device arranged at a connection between a leg of a marine structure and a pile of a fundament.

In FIG. 1 is a marine installation 2 according to an embodiment of the invention disclosed. The installation 2 comprises a device 1 arranged at a connection between a leg 3 of a marine structure and a pile 5 of a fundament. In the disclosed embodiment in FIG. 1, two devices 1 are seen arranged at the outer part of the leg 3.

The installation 2 is established by means of that legs 3 of a marine structure are lower and inserted into an opening in piles 5 of the fundament in the seabed. The device 1 or devices 1 are configured to be attached to the outer part of the legs 3, as disclosed in FIG. 1, and establishing a temporary connection between the legs 3 and the pile 5 prior to and during a grouting operation. The device 1 will be explained in detail in the following.

The device 1 comprises a sleeve element 10 and a connection assembly 25 configured to firmly connect the device 1 to the outer part of the leg 3. After being attached to the leg 3 of the marine structure, the sleeve element 10 is configured, together with the leg 3, to be brought to vicinity of an upper portion of the pile 5 as the leg 3 is inserted into the opening in the pile 5.

The device 1 further comprises a clamping arrangement attached to the sleeve element 10. The clamping arrangement comprising a clamping device 15 configured to form an attachment between the sleeve element 10 and the upper portion of the pile 5. The clamping device 15 is further configured to provide an electric connection from an engagement of the clamping device 15 with the pile 5 to a connection between the connection assembly 25 and the leg 3 of the structure.

In the disclosed embodiment, the device 1 is provided with two clamping devices 15. The clamping device 15 comprising a clamp mechanism 32 comprising a displaceable wedge 30 configured to form a wedged engagement with the upper portion of the pile 5. The clamp mechanism 32 will be explained further in detail with reference to FIG. 4.

The device 1 further comprises a damping arrangement comprising a damping device 20 configured to be brought to engagement with an upper portion of the pile 5 when the leg 3 is inserted into the opening of the pile 5. The damping device 20 comprises displaceable piston rod that engages with upper portion of the pile 5 when the damping device 20 configured to be brought to engagement with an upper portion of the pile 5. Thereby, an impact between the pile 5 and the sleeve element 10 is dampened. The damping device 20 is further configured to be used for setting the structure in a vertical or substantial vertical position.

The damping device 20 comprises for example one of a hydraulic, pneumatic and electric driven piston rod. The position piston rod is configured to be controlled by means of a further drive unit so that an inserted length of the leg 3 in the opening of the pile 5 is adjusted.

The damping device 20 comprises the drive unit or the damping device 20 comprises connection means for connection to a drive unit, such as located at a Remotely Operated Vehicle (ROV).

Figure 2:
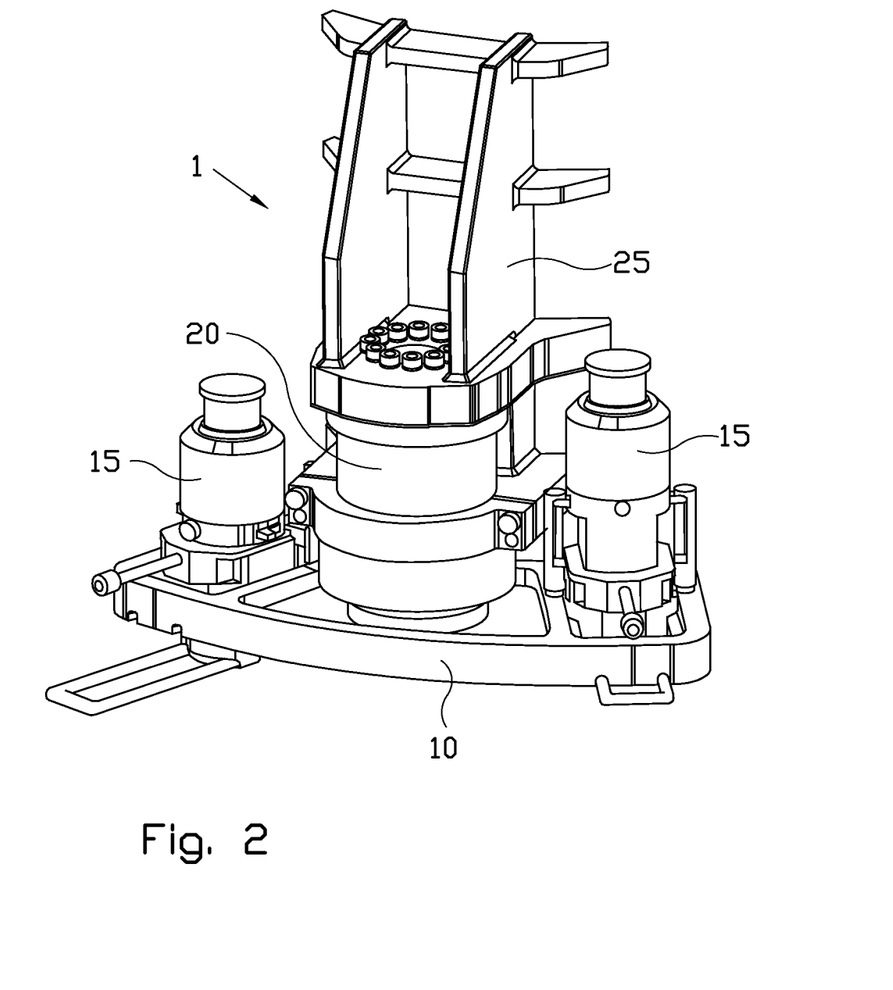
FIG. 2 discloses a further view of one of the devices in FIG. 1.
Figure 3:
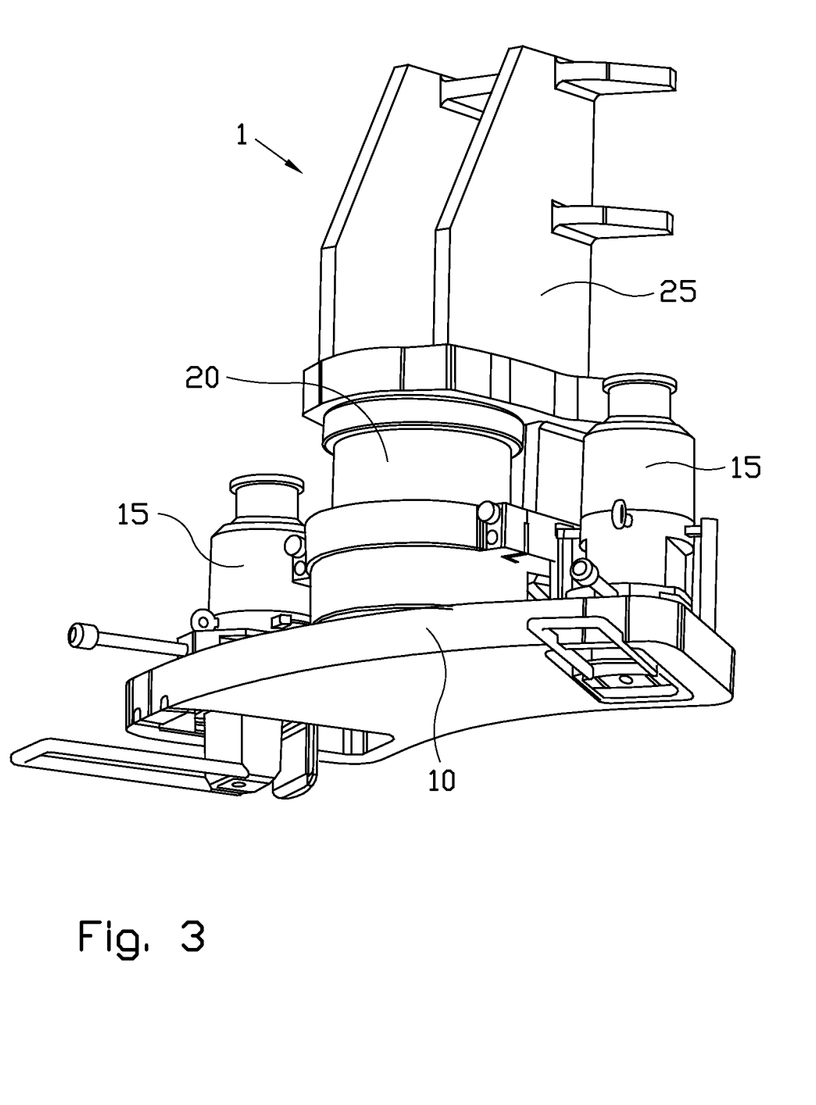
FIG. 3 discloses a yet another view of one of the devices in FIG. 1.

In FIGS. 2 and 3 are different views of the device 1 in FIG. 1 disclosed in further details. In the disclosed embodiment, the connection assembly 25 is connected to an upper part of the damping device 20.

Figure 4:
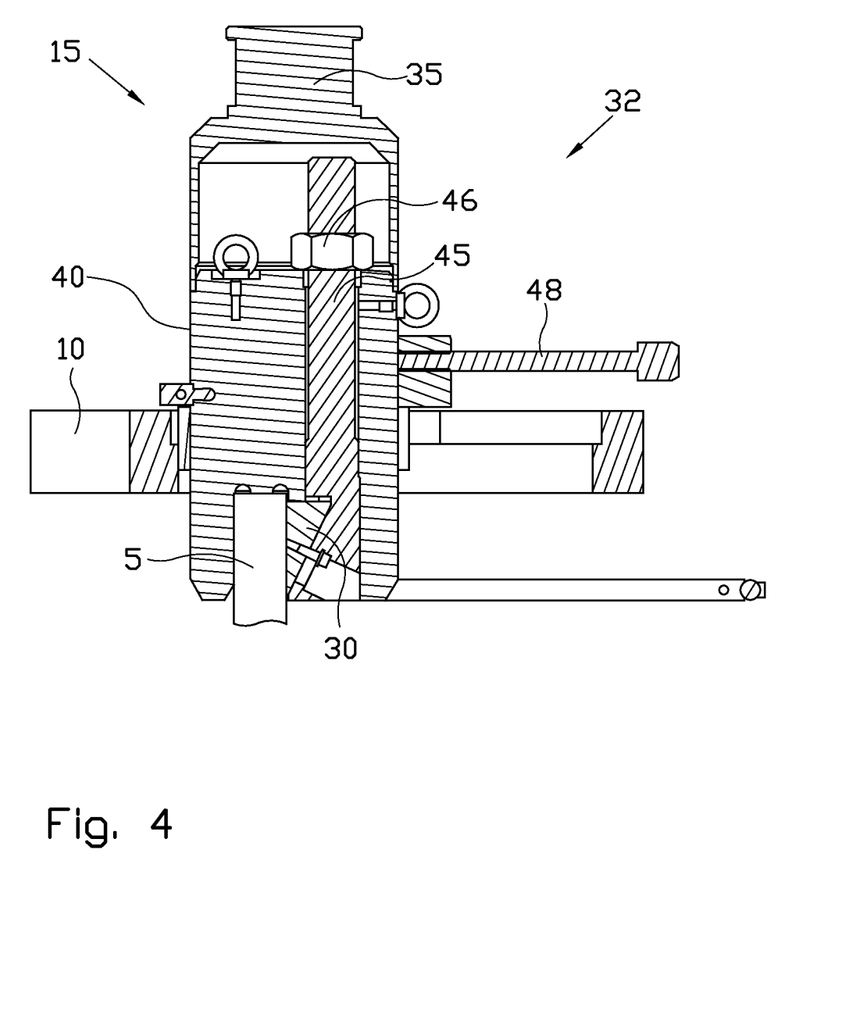
FIG. 4 discloses an embodiment of a clamping device of the device in FIG. 1.

In FIG. 4 is an embodiment of a clamping device 15 of the device 1 in FIG. 1 disclosed in a cross section. The clamping device 15 comprises a displaceable wedge 30 and a clamp mechanism 32 for controlling the displacement of the wedge 30. In the disclosed embodiment in FIG. 4, the clamping device 15 is provided with a cap 35 for protecting the clamp mechanism 32. The cap 35 is adapted to be removed in order to access the clamp mechanism 32.

The clamping device 15 comprises a body 40 holding the wedge 30 and the clamp mechanism 32. The body 40 comprises an opening for receiving a wall section of the pile 5 at the upper portion of the pile 5. The clamping device 15 comprises a setting member for activating the clamp mechanism 32 and forming the attachment between the sleeve element and the upper portion of the pile 5.

When the wall section of the pile 5 has been introduced in the opening, the wedge 30 is positioned in vicinity to an envelope surface of the upper portion of the pile 5 and the wedge 30 is configured to be displaced by means of the clamping mechanism to engagement with the envelope surface of the pile 5. Thereby, a rigid connection is formed between the leg 3 of the structure and the pile 5, which enables the structure to be released from a jack-up platform or a crane vessel for a subsequent grouting operation.

In the disclosed embodiment, the setting member comprises an axial displaceable bolt 45 configured to act on the wedge 30 so that the wedge 30 is displaced into engagement with said envelope surface of the pile 5. The displaceable bolt 45 is configured to be controlled by means of a drive unit. The drive unit may be a part of the clamping device 15 or the clamping device 15 comprises connection means for connection to an external a drive unit, such as arranged at a ROV. The drive unit is for example one of a hydraulic, pneumatic and electric driven drive unit.

In the disclosed embodiment, the clamp mechanism 32 comprises a nut 46 for locking the displacement of the bolt 45. In the disclosed embodiment, the clamp mechanism 32 further comprises a release mechanism with a release bolt 48 for quickly releasing an engagement between the wedge 30 and the envelope surface of the pile 5.

It shall be understood that alternative embodiments of the clamping mechanism are applicable, such as pulling a displaceable bolt or a threaded bolt configured to be rotated for the purpose of acting on the wedge, and etcetera.

Figure 5:
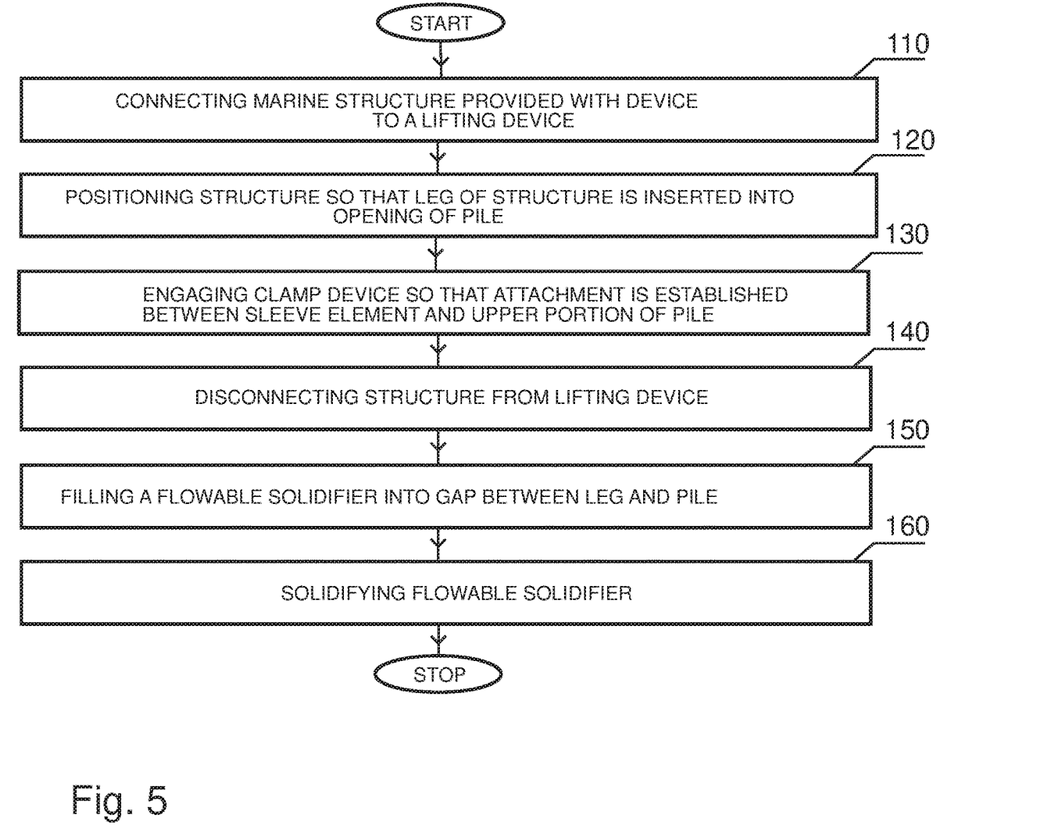
FIG. 5 discloses a flow chart of a method according to an embodiment of the invention.

In FIG. 5 is a flow chart of a method for establishing a marine installation according to an embodiment of the invention disclosed.

The method is initiated in a step 110 of connecting the marine structure provided with the device 1 to a lifting device, such as crane of a crane ship. The device 1 is firmly connected to the at least one leg 3 of the structure by means of the connection assembly 25.

In a step 120, the method comprises positioning the marine structure so that the at least one leg 3 of the structure is inserted into the opening of the pile 5. The positioning generally relates to an operation of lowering the structure towards the pile 5 or piles 5 so the that at least one leg 3 enters into the opening of the respective pile 5. The at least one leg 3 is inserted to an extent until the sleeve element 10 of the device 1 contacts the upper portion of the respective pile 5.

In a step 130, the method comprises engaging the at least one clamping device 15 of the device 1 so that an attachment is established between the sleeve element 10 and an upper portion of the pile 5. The attachment is established by means of the at least one clamping device 15 of the device 1. The engagement of the at least one clamping device 15 may for example be induced by a remotely operated vehicle, so called ROV.

By engaging the at least one clamping device 15 an electric connection between the pile 5 and the leg 3 of the structure is provided. By means of the electrical connection between the structure and the pile 5, corrosion control measures may be implemented for the structure and the pile 5, such as corrosion control involving cathodic protection.

In a step 140, the method comprises disconnecting the marine structure from the lifting device. By means of device 1 and the method of the invention, the attachment between the sleeve element 10 and the pile 5 enables the lifting device to be disconnected and further permits the structure to be left standing until a subsequent grouting operation. Accordingly, the device 1 and the method of the invention facilitates the installation of the structure in that the need for the lifting device is reduced.

In a step 150, the method comprises filling a flowable solidifier into a gap at the leg 3 and the pile 5 after the attachment is established between the sleeve element 10 and a upper portion of the pile 5. In a step 160, the method comprises solidifying the flowable solidifier. The flowable solidifier has the function of providing the permanent attachment of the structure to the pile 5.

Figure 6:
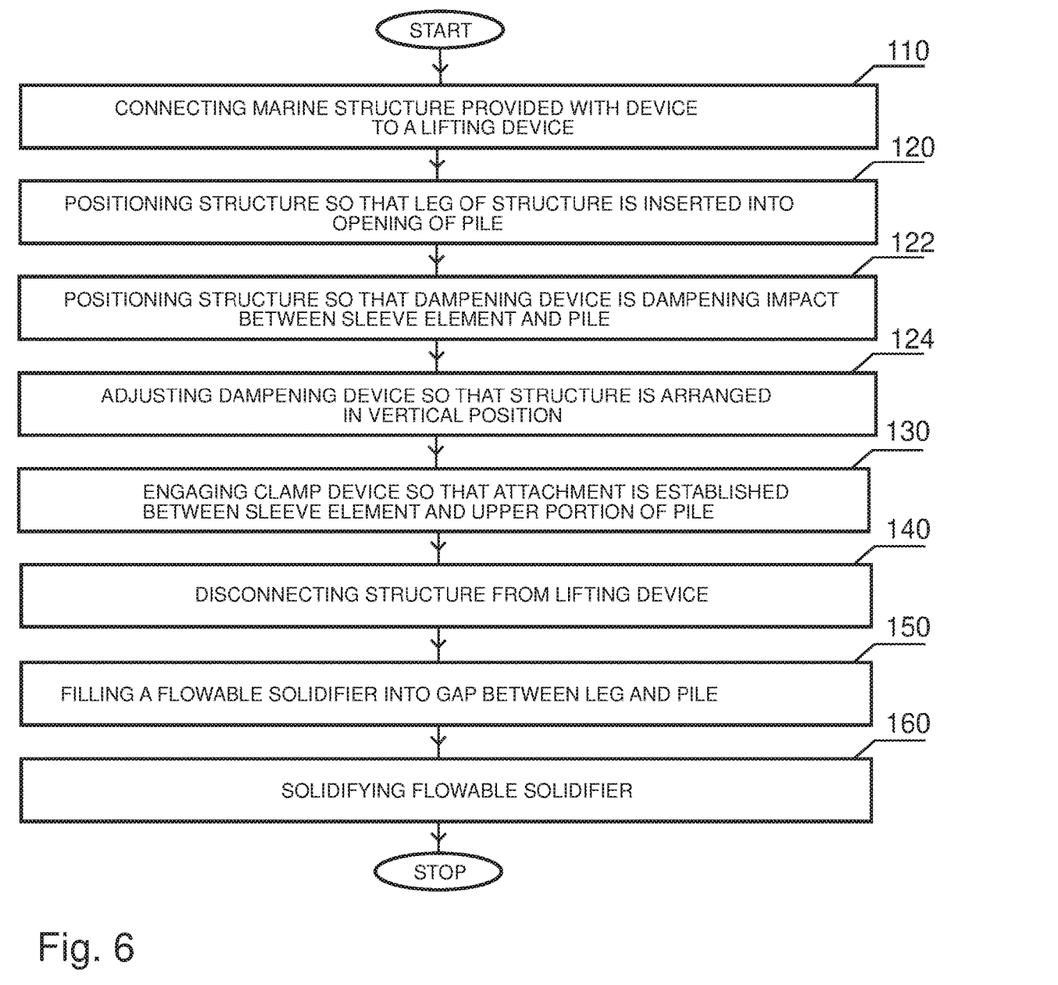
FIG. 6 discloses a flow chart of an embodiment of possible additional steps to the method in FIG. 5.

In FIG. 6 is a flow chart is disclosed of an embodiment of possible additional steps to the method in FIG. 5.

In a step 122, the method comprises positioning the marine structure so that the damping device 20 is dampening an impact between the sleeve element 10 and the pile 5. By means of dampening the impact as the leg 3 of the structure is inserted into the opening of the pile 5, the risk of damage to the structure or the pile 5 is reduced.

In a step 124, the method further comprises the step of displacing the piston rod of the damping device 20 so that an inserted length of the leg 3 in the opening of the pile 5 is adjusted. In particular, the step involves displacing at least one of the piston rods of the damping devices 20 so that the structure is arranged in a vertical or substantial vertical orientation in respect to the surface of the sea.

Accordingly, the damping device 20 facilitates the operation of positioning the leg 3 of the structure into the opening in the pile 5 and further enables the structure to be set in the vertical orientation. When the structure comprises a plurality of legs 3, such as in FIG. 5, the damping devices 20 are used to adjust the position between the sleeve element 10 and the pile 5 so that all the legs 3 are aligned, and the structure is arranged in a vertical or substantial vertical orientation in respect to the surface of the sea.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A device for securing a connection to be formed between a leg of a marine structure and a pile of a fundament fastened in a seabed, wherein the connection comprising the leg is partly inserted into an opening of the pile, and wherein the device is configured to be connected to the leg, the device comprising:
  a sleeve element configured, together with the leg, to be brought to vicinity of an upper portion of the pile, and
  a clamping arrangement attached to the sleeve element comprising at least one clamping device configured to form an attachment between the sleeve element and the upper portion of the pile wherein the at least one clamping device comprises a clamp mechanism comprising:
    a displaceable wedge configured to form a wedged engagement with the upper portion of the pile; and
    a setting member configured to act on the displaceable wedge for forming the attachment between the sleeve element and the upper portion of the pile, wherein the setting member comprises an axially displaceable bolt that is configured to act on the displaceable wedge so that the displaceable wedge is displaced into engagement with an envelope surface of the pile.

2. The device according to claim 1, wherein the axially displaceable bolt is configured to be controlled by a drive unit, wherein the at least one clamping device comprises the drive unit or the at least one clamping device comprises connection means for connection to the drive unit.

3. The device according to claim 2, wherein the drive unit is one of a hydraulic, a pneumatic and an electric driven drive unit.

4. The device according to claim 1, wherein the device comprises a damping arrangement attached to the sleeve element comprising at least one damping device configured to be brought to engagement with a top portion of the pile when the leg is inserted into the opening of the pile, wherein the at least one damping device comprises a displaceable piston rod configured to engage with the top portion of the pile so that an impact between the pile and the sleeve element is dampened.

5. The device according to claim 4, wherein the at least one damping device is configured to be controlled by a drive unit so that an inserted length of the leg in the opening of the pile is adjusted, wherein the at least one damping device comprises the drive unit or the at least one damping device comprises connection means for connection to a further drive unit.

6. The device according to claim 1, wherein the device comprises a connection assembly configured to connect the device to the leg.

7. The device according to claim 1, wherein the device is further configured to provide an electric connection by engagement of the at least one clamping device with the pile so that the electrical connection is established between the pile and the leg of the marine structure.

8. The device according to claim 4, wherein the at least one damping device comprises one of a hydraulic, a pneumatic and an electric driven piston rod.

9. A marine arrangement comprising a marine structure with one or more legs and a device for securing a connection to be formed between said one or more legs and a pile of a fundament fastened in a seabed, wherein the connection comprising said one or more legs partly inserted into an opening of the pile, wherein the device is configured to be connected to said one or more legs, the device comprising a sleeve element configured, together with the one or more legs of the marine structure, to be brought to vicinity of an upper portion of the pile, and a clamping arrangement attached to the sleeve element comprising at least one clamping device configured to form an attachment between the sleeve element and the upper portion of the pile wherein the at least one clamping device comprises a clamp mechanism comprising:
  a displaceable wedge configured to form a wedged engagement with the upper portion of the pile; and a setting member configured to act on the displaceable wedge for forming the attachment between the sleeve element and the upper portion of the pile, wherein the setting member comprises an axially displaceable bolt that is configured to act on the displaceable wedge so that the displaceable wedge is displaced into engagement with an envelope surface of the pile, wherein the device is attached to an end portion of said one or more legs.

10. The marine arrangement according to claim 9 further comprising a remotely operated vehicle comprising a drive unit.

11. A marine installation comprising a marine structure with one or more legs, a device for securing a connection to be formed between said one or more legs and a pile of a fundament fastened in a seabed, wherein the connection comprising the one or more legs partly inserted into an opening of the pile, wherein the device is configured to be connected to said one or more legs, the device comprising a sleeve element configured, together with the one or more legs of the marine structure, to be brought to vicinity of an upper portion of the pile, and a clamping arrangement attached to the sleeve element comprising at least one clamping device configured to form an attachment between the sleeve element and the upper portion of the pile wherein the at least one clamping device comprises a clamp mechanism comprising:
  a displaceable wedge configured to form a wedged engagement with the upper portion of the pile; and a setting member configured to act on the displaceable wedge for forming the attachment between the sleeve element and the upper portion of the pile, wherein the setting member comprises an axially displaceable bolt that is configured to act on the displaceable wedge so that the displaceable wedge is displaced into engagement with an envelope surface of the pile, wherein the device is attached to said one or more legs of the marine structure and a pile of a fundament fastened in a seabed, wherein the at least one clamping device has formed an attachment between the sleeve element and a top portion of the pile.

12. A method for establishing a marine installation involving a device for securing a connection to be formed between a leg of a marine structure and a pile of a fundament fastened in a seabed, wherein the connection comprising the leg partly inserted into an opening of the pile, wherein the device is configured to be connected to the leg, the device comprising a sleeve element configured, together with the leg, to be brought to vicinity of an upper portion of the pile, and a clamping arrangement attached to the sleeve element comprising at least one clamping device configured to form an attachment between the sleeve element and the upper portion of the pile wherein the at least one clamping device comprises a clamp mechanism comprising: a displaceable wedge configured to form a wedged engagement with the upper portion of the pile; and a setting member configured to act on the displaceable wedge for forming the attachment between the sleeve element and the upper portion of the pile, wherein the setting member comprises an axially displaceable bolt that is configured to act on the displaceable wedge so that the displaceable wedge is displaced into engagement with an envelope surface of the pile; wherein the method comprises the steps of:

connecting the marine structure provided with the device connected to the leg to a lifting device positioning the marine structure so that the leg is inserted into the opening of the pile, engaging the at least one clamping device so that an attachment is established between the sleeve element and a top portion of the pile, and disconnecting the marine structure from the lifting device.

13. The method according to claim 12, wherein the method further comprises:

filling a flowable solidifier into a gap at the leg and the pile after the attachment is established between the sleeve element and the top portion of the pile.

14. The method according to claim 12, wherein the method further comprises:

positioning the marine structure so that a damping device is dampening an impact between the sleeve element and the pile.

15. The method according to claim 12, wherein the method further comprises:

displacing a piston rod of a damping device so that an inserted length of the leg in the opening of the pile is adjusted.

16. The method according to claim 12, wherein the method further comprises:

displacing at least one piston rod of a damping device at the leg so that the marine structure is arranged in a vertical or substantial vertical position in respect to a surface of a sea.

17. The method according to claim 12, wherein the method further comprises:

establishing a connection between a remotely operated vehicle and the device for controlling the at least one clamping device and a damping device.

\* \* \* \* \*